US011337116B2

(12) United States Patent
Aydin et al.

(10) Patent No.: US 11,337,116 B2
(45) Date of Patent: May 17, 2022

(54) SEAMLESS REPLACEMENT OF A FIRST DRONE BASE STATION WITH A SECOND DRONE BASE STATION

(71) Applicant: Alcatel Lucent, Boulogne Billancourt (FR)

(72) Inventors: Osman Aydin, Stuttgart (DE); Ilaria Malanchini, Stuttgart (DE); Jens Gebert, Stuttgart (DE)

(73) Assignee: Alcatel Lucent, Nozay (FR)

( * ) Notice: Subject to any disclaimer, the term of this patent is extended or adjusted under 35 U.S.C. 154(b) by 407 days.

(21) Appl. No.: 15/327,957

(22) PCT Filed: Jul. 21, 2015

(86) PCT No.: PCT/EP2015/066621
§ 371 (c)(1),
(2) Date: Jan. 20, 2017

(87) PCT Pub. No.: WO2016/012437
PCT Pub. Date: Jan. 28, 2016

(65) Prior Publication Data
US 2017/0208512 A1 Jul. 20, 2017

(30) Foreign Application Priority Data

Jul. 22, 2014 (EP) .................................... 14290212

(51) Int. Cl.
*H04W 36/00* (2009.01)
*H04B 7/185* (2006.01)
(Continued)

(52) U.S. Cl.
CPC ....... *H04W 36/0009* (2018.08); *B64C 39/024* (2013.01); *G05D 1/0022* (2013.01);
(Continued)

(58) Field of Classification Search
CPC ............. H04W 36/18; H04W 36/0055; H04W 72/0413; H04W 72/042; H04W 84/06;
(Continued)

(56) References Cited

U.S. PATENT DOCUMENTS

2003/0157943 A1* 8/2003 Sabat, Jr. ............. H04B 7/2606
455/456.1
2011/0098053 A1 4/2011 Widegren et al.
(Continued)

FOREIGN PATENT DOCUMENTS

| CN | 101983516 A | 3/2011 |
| CN | 102 056 126 A | 5/2011 |

(Continued)

OTHER PUBLICATIONS

International Search Report for PCT/EP2015/066621 dated Sep. 30, 2015.

*Primary Examiner* — Robert C Scheibel
(74) *Attorney, Agent, or Firm* — Fay Sharpe LLP

(57) ABSTRACT

A method is provided of replacing a first drone base station with a second drone base station, the first drone base station, the method comprising: sending by the first drone base station first pilot signals indicating a cell identifier; receiving by the first drone base station information that the second drone base station is in the vicinity of the first drone base station; sending by the second drone base station second pilot signals which indicate the same cell identifier as the first drone base station; receiving by the first drone base station from the second drone base station an indication to cease to send first pilot signals; and dependent upon receiving by the first drone base station from the second drone base station the indication to cease to send first pilot signals, ceasing by the first drone base station the sending of first pilot signals.

9 Claims, 8 Drawing Sheets

(51) Int. Cl.

| | | |
|---|---|---|
| *B64C 39/02* | (2006.01) | |
| *G05D 1/00* | (2006.01) | |
| *G05D 1/02* | (2020.01) | |
| *G08G 5/00* | (2006.01) | |
| *H04L 5/00* | (2006.01) | |
| *H04L 61/5007* | (2022.01) | |
| *H04W 72/04* | (2009.01) | |
| *H04W 84/06* | (2009.01) | |
| *H04W 88/02* | (2009.01) | |

(52) U.S. Cl.
CPC ......... *G05D 1/0027* (2013.01); *G05D 1/0202* (2013.01); *G08G 5/0013* (2013.01); *G08G 5/0043* (2013.01); *H04B 7/18504* (2013.01); *H04L 5/005* (2013.01); *H04L 61/2007* (2013.01); *H04W 36/0055* (2013.01); *H04W 36/0058* (2018.08); *H04W 36/0069* (2018.08); *H04W 72/042* (2013.01); *H04W 72/0413* (2013.01); *B64C 2201/122* (2013.01); *B64C 2201/143* (2013.01); *H04W 84/06* (2013.01); *H04W 88/02* (2013.01)

(58) Field of Classification Search
CPC ................. H04W 88/02; B64C 39/024; B64C 2201/122; B64C 2201/143; G05D 1/0022; G05D 1/0027; G05D 1/0202; G08G 5/0013; G08G 5/0043; H04B 7/18504; H04L 5/005; H04L 61/2007
See application file for complete search history.

(56) References Cited

U.S. PATENT DOCUMENTS

| | | | | |
|---|---|---|---|---|
| 2012/0281640 | A1* | 11/2012 | Xu | H04L 5/0048 370/329 |
| 2013/0196666 | A1 | 8/2013 | Zhang et al. | |
| 2013/0303081 | A1* | 11/2013 | Chang | H04W 36/0061 455/11.1 |
| 2013/0337822 | A1* | 12/2013 | Rubin | H04W 72/12 455/452.1 |
| 2014/0003327 | A1* | 1/2014 | Seo | H04W 36/08 370/315 |
| 2014/0003394 | A1 | 1/2014 | Rubin et al. | |
| 2014/0185528 | A1* | 7/2014 | Shimezawa | H04W 52/42 370/328 |
| 2014/0211717 | A1 | 7/2014 | Jitsukawa | |
| 2014/0219248 | A1* | 8/2014 | Reddiboyana | H04W 76/15 370/331 |
| 2014/0335869 | A1* | 11/2014 | Choi | H04W 36/0072 455/438 |
| 2015/0092578 | A1* | 4/2015 | Ingale | H04W 48/16 370/252 |
| 2015/0336667 | A1* | 11/2015 | Srivastava | B64C 39/024 701/2 |
| 2015/0379874 | A1* | 12/2015 | Ubhi | G01S 5/0027 701/3 |
| 2019/0023392 | A1* | 1/2019 | Micros | B64C 33/025 |

FOREIGN PATENT DOCUMENTS

| | | |
|---|---|---|
| CN | 103 051 373 A | 4/2013 |
| CN | 103650446 A | 3/2014 |
| EP | 2120479 A1 | 11/2009 |
| EP | 2166735 A1 | 3/2010 |
| JP | 2004080466 A | 3/2004 |
| JP | 2010536272 A | 11/2010 |
| JP | 2011-023955 | 2/2011 |
| WO | WO 2008/096685 A1 | 8/2008 |
| WO | WO 2009/021217 A1 | 2/2009 |
| WO | WO 2013/046471 A1 | 4/2013 |
| WO | WO 2013/137700 A1 | 9/2013 |
| WO | WO 2013/188629 A2 | 12/2013 |

\* cited by examiner

X2 ROUTED VIA BACKHAUL NODE

ALTERNATIVE

DIRECT X2 INTERFACE BETWEEN THE DBSs

USE OF ONE FREQUENCY

DRONE WITH BASE STATION INCLUDING TRANSCEIVER

ALTERNATIVE
DRONE WITH REMOTE RADIO HEAD (RRH)

ALTERNATIVE

SEAMLESS REPLACEMENT OF A FIRST DRONE BASE STATION WITH A SECOND DRONE BASE STATION

FIELD OF THE INVENTION

The present invention relates to telecommunications, in particular to wireless telecommunications.

DESCRIPTION OF THE RELATED ART

In coming years, operators of networks for wireless cellular telecommunications face a great increase in traffic. Small cell base stations are useful to address this, so operators are considering methodologies regarding where to place small cell base stations, and how to manage them intelligently in an energy efficient manner, for example controlling turn-on/turn-off. Operators understand that where small cells are deployed is important because small cell base stations should usually be placed at appropriate locations that allow plenty of traffic to be offloaded from macrocell base stations.

Small cell base stations are often referred to simply as small cells.

A significant development regarding where and how to place a small cell is to use a small cell mounted on a drone. A drone is a small pilot-less radio controlled aircraft, often referred to as an unmanned aerial vehicle (UAV). The resulting "flying small cell" can be directed by the operator to be at a desired location for the specific period that the operator desires the flying small cell to be there. Accordingly, flying small cells can be placed and moved around accordingly to changes in traffic demand.

A flying small cell is often known as a drone base station (sometimes denoted Drone BS or DBS), and can help address traffic demand in one or both of two ways. These are coverage extension and capacity expansion as explained in turn as follows.

Coverage extension occurs, for example, in a scenario where cellular coverage is not available, so the drone base station is directed to the location where coverage is needed, so as to extend the geographical are covered by the network. This need may arise in the event of a terrestrial base station failing, or, for example, in the event of a catastrophic situation occurring in a sparsely-populated area where rescue personnel need connectivity.

Capacity expansion occurs where the drone base station flying to a location of temporarily high traffic demand in order to provide additional traffic capacity. For example, during a sports event or concert, the drone base station flies to the location of that event to handle some of the traffic.

SUMMARY

The reader is referred to the appended independent claims. Some preferred features are laid out in the dependent claims.

An example of the present invention is a method of replacing a first drone base station with a second drone base station, the method comprising:

sending by the first drone base station first pilot signals indicating a cell identifier;

receiving by the first drone base station information that the second drone base station is in the vicinity of the first drone base station;

sending by the second drone base station second pilot signals which indicate the same cell identifier as the first drone base station;

receiving by the first drone base station from the second drone base station an indication to cease to send first pilot signals; and dependent upon receiving by the first drone base station from the second drone base station the indication to cease to send first pilot signals, ceasing by the first drone base station the sending of first pilot signals.

Some preferred embodiments provide a wireless drone base station replacement procedure that is invisible to user terminals.

Some preferred embodiments provide a method of replacing a first drone base station which has to stop its service, in which the replacement drone base station uses the same radio frequency band and cell identifier as the first drone base station. This is so as to provide a seamless replacement which is invisible to connected user terminals. This process is invisible to the user terminals. Traditional handovers of individual user terminals are not used. The user terminals see no change in cell identifier, namely Cell ID. User terminals also see no change in C-RNTI (Radio Network Temporary Identifier).

Preferred embodiments provide good performance as interruptions due to drone replacements are limited to the time taken for the network to switch the downlink data path from via the first drone base station to via the second drone base station. This time is often less than the interruption that occurs in known networks using traditional handovers. Traditional handovers involve cell switching performed by user terminals over an air interface.

Some preferred embodiments have the advantage of a simple and quick drone replacement procedure, enabling quality service and increased capacity in mobile network. Also, coverage may be increased, particularly in inaccessible terrain, for example where a terrestrial base station is unsuitable.

Examples of the present invention also relates to a corresponding first drone base station, a corresponding second drone base station and a controller of drone base station replacement. For example of the present invention also relates to a first drone base station configured to be replaced by a second drone base station, the first drone base station comprising:

means to send first pilot signals indicating a cell identifier;

means to receive information that the second drone base station is in the vicinity of the first drone base station;

means to receive from the second drone base station an indication to cease to send first pilot signals; and means to cease the sending of first pilot signals dependent upon receiving from the second drone base station the indication to cease to send first pilot signals.

Preferably the means to send comprises a transmitter, the means to receive comprise a receiver or receivers, and the means to cease comprises a transmitter controller.

Preferably the first drone base station further comprises:

means to, upon being informed that the second drone base station is in the vicinity, send user context information of connections with user terminals towards the second drone base station;

means to receive an instruction to stop uplink reception; and means to, in response, stop uplink user data connections with the plurality of user terminals to the first drone base station and means to send an acknowledgment of the instruction towards the second base station.

Preferably the first drone base station comprises means to send, together with the acknowledgement, user context data of uplink user data that has been received and forwarded by the first drone base station to a backhaul node.

Another example of the present invention relates to a second drone base station configured to replace a first drone base station that is configured to send first pilot signals indicating a cell identifier, the second drone base station comprising:

means to receive a command to fly to a given location in the vicinity of the first drone base station, means to transmit a signal indicating that the location has been flown to, means to send from the second drone base station second pilot signals which indicate the same cell identifier as the first drone base station;

means to send towards the first drone base station an indication to cease to send first pilot signals.

Preferably the means to receive comprises a receiver, the means to transmit comprises a transmitter, and the means to send comprise a transmitter or transmitters.

Preferably the second drone base station further comprises:

means to receive user context information from the first drone base station of the connections with the plurality of user terminals, means to undertake uplink reception, means to send towards the first drone base station an instruction to stop uplink reception so as to have the uplink user data connections with the plurality of user terminals with the second drone base station but not with the first drone base station, means to receive from the first base station an acknowledgement of the instruction.

Preferably the second drone base station further comprises:

means to send an instruction towards a backhaul node to switch the path for downlink user data from via the first drone base station to via the second drone base station by making use of IP addresses to differentiate between the first and second base stations.

Another example of the present invention relates to a controller of drone base station replacement, the controller comprising:

means to receive a message indicating that a first drone base station which sends first pilot signals indicating a cell identifier should be replaced;

means to send a command towards a second drone base station to fly to a given location in the vicinity of the first drone base station, means to receive an indication from the second drone base station that the second drone base station has arrived at the given location, means to send an indication towards the first base station that the second drone base station is now in the vicinity of the first drone base station, the indication being a trigger for the second drone base station, upon sending second pilot signals which indicate the same cell identifier as the first drone base station, to send to the first drone base station an indication to cease to send first pilot signals, and means to command the first drone base station to fly away.

Preferably the means to receive comprises a receiver or receivers, the means to send comprise a transmitter or transmitters, and the means to command comprises a processor.

Preferably the controller comprises means to receive a request from the second drone base station for downlink user data to be sent to the second drone base station instead of the first drone base station by making use of IP addresses to differentiate between the first and second base stations, and means to in response to receiving the request switch to sending the downlink user data via the second drone base station.

BRIEF DESCRIPTION OF THE DRAWINGS

An embodiment of the present invention will now be described by way of example and with reference to the drawings, in which.

DETAILED DESCRIPTION

Figure 1:
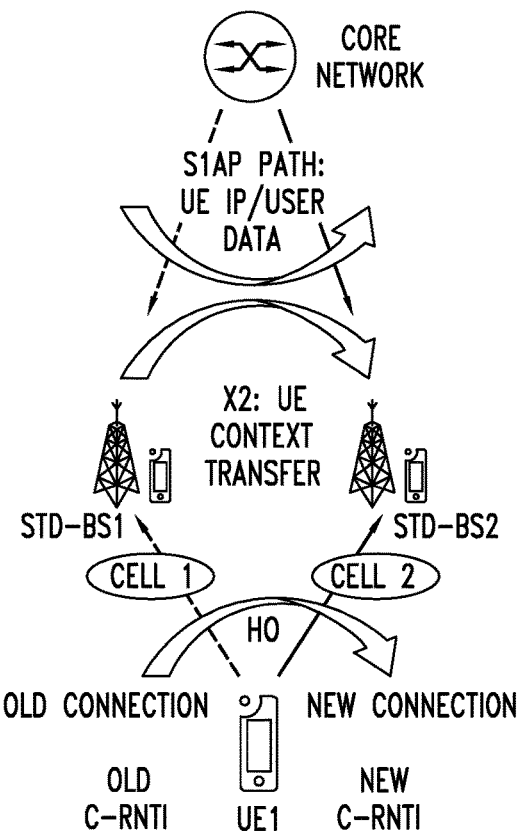
FIG. 1 is a diagram illustrating a known handover procedure (PRIOR ART)

A known technique for handover between cellular base stations is shown in FIG. 1. The technique involves radio handover of the connection between the base stations, transfer of user terminal (UE) context data over the X2 backhaul interface between the base stations, and updating the S1AP path routing for a User terminal's Internet Protocol (IP) data and user data via the core network. There are three known options for handover, namely "Break before Make", "Make before Break" and dual connectivity. In all these procedures, the Cell Identity (Cell ID) that identifies the base station that is connected to must be changed. Also the Radio Network Temporary Identifier (RNTI) of a user terminal is changed due to handover, as RNTIs identify information for a particular user in a particular cell where common or shared channels are used for data transmission.

Figure 2:
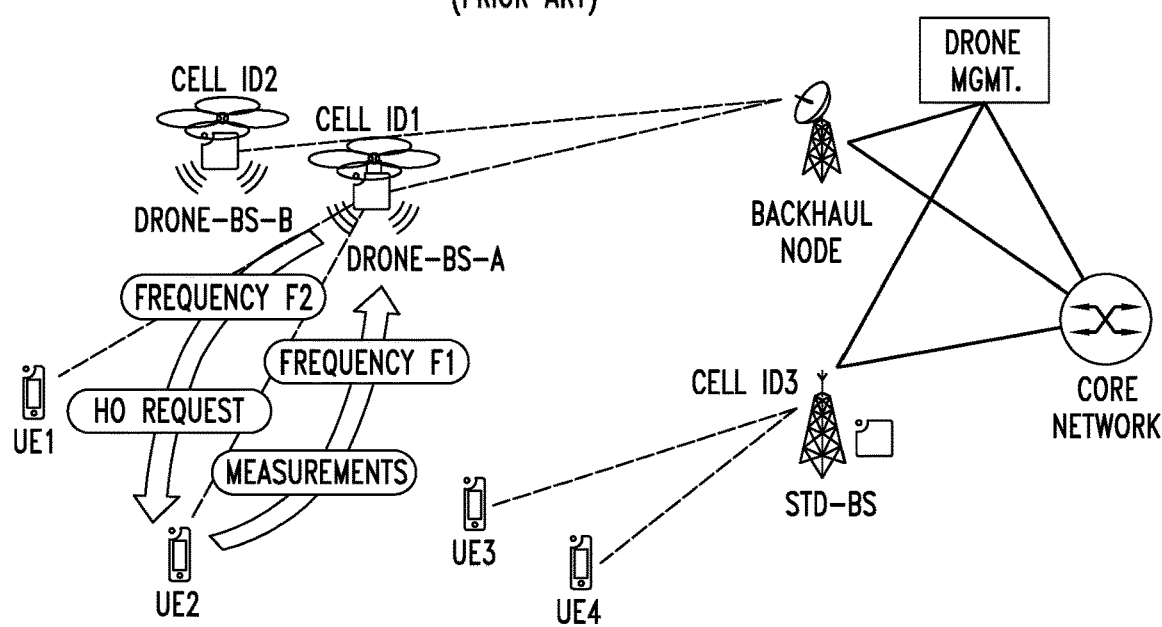
FIG. 2 is a diagram illustrating a known drone base station handover procedure (PRIOR ART)

Considering replacement of drone base stations, in a manner that appears seamless in terms of service provided to user terminals, a known technique is illustrated in FIG. 2. It consists of the following steps. The serving drone base station (Drone-BS-A) having cell Id1 informs the drone management module connected via a backhaul node of the need for replacement. In consequence the drone management module directs Drone-BS-B to the location of Drone-BS-A. Configuration data is transferred from Drone-BS-A to Drone-BS-B. Then Drone-BS-B activates its cell coverage (Cell Id2). Drone-BS-A then reduces its pilot power so as to trigger handovers. Currently connected user terminals are then handed over from Drone-BS-A to Drone-BS-B. This involves user terminals providing measurements of pilot signals of neighbouring cells in known fashion, triggering a handover request message by Drone-BS-A for the particular user terminal. It is identified that Cell ID2 (namely Drone-BS-B) which operated at a different frequency band is to be the target cell for handover, and handover is effected to the cell having Cell ID2. Once these handovers are complete, Drone-BS-A ceases providing wireless service and is directed to fly away.

The inventors realised that this known approach was complex and slow, and an approach giving improved performance could be provided as described below.

An example network will first be described from a structural perspective then example operation in terms of drone replacement will be explained.

Network

Figure 3:
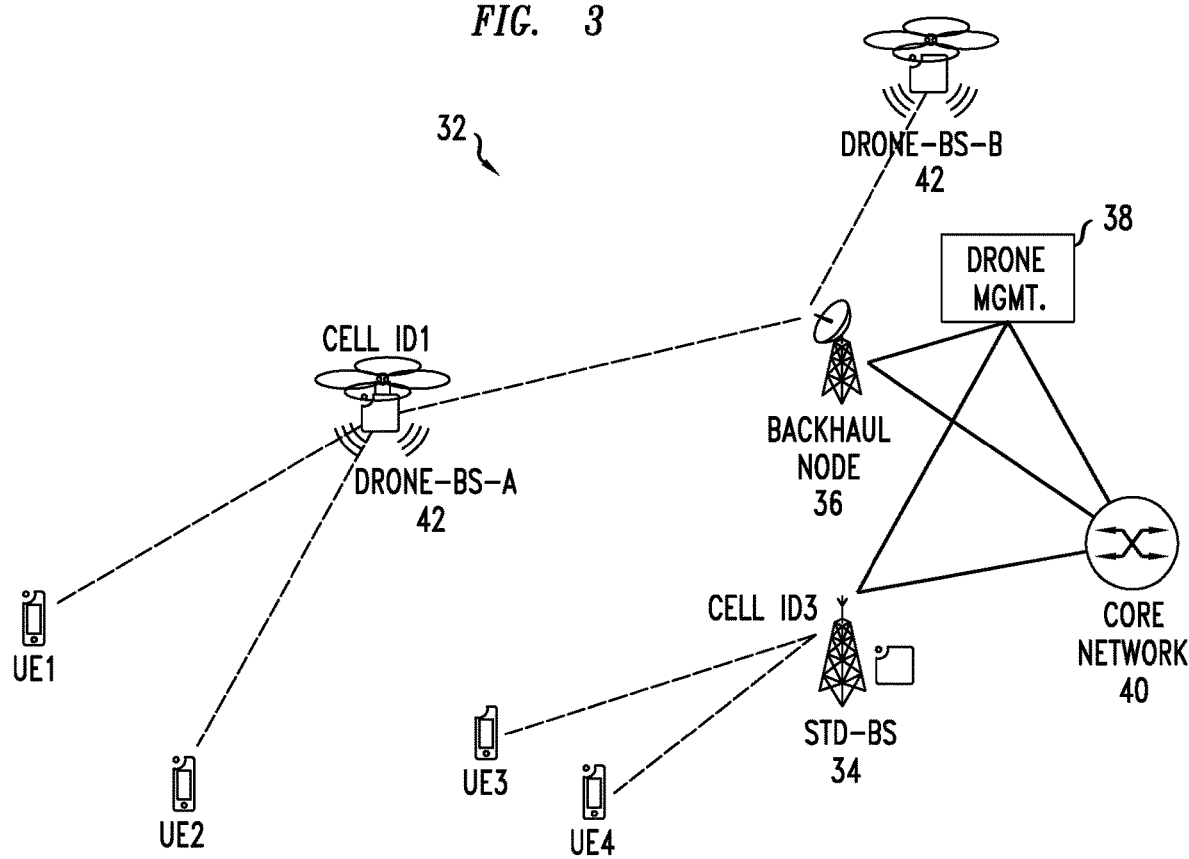
FIG. 3 is a diagram illustrating a network according to a first embodiment of the present invention at a first time where drone BS-A serves certain users.
Figure 4:
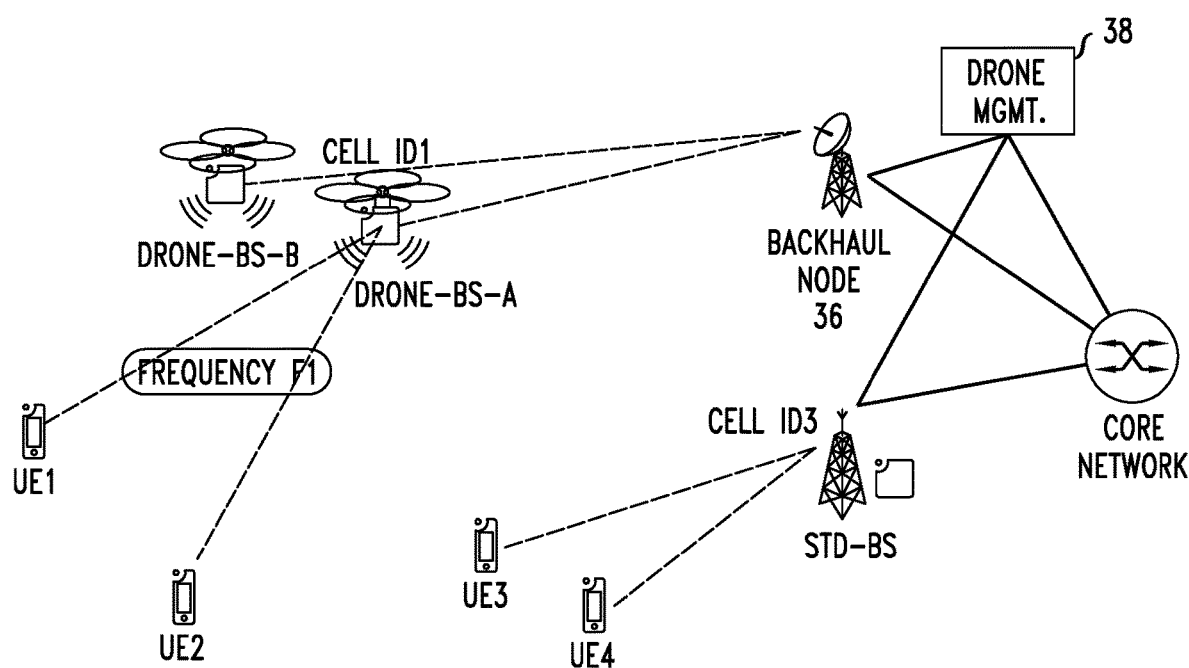
FIG. 4 is a diagram illustrating the network shown in FIG. 3 but at a later time when a drone BS-B flies to the target location in preparation to be handed over to, FIG. 5 is a diagram illustrating the network shown in FIG. 4 but at a later time at which the drone BS-B has been handed over to, so has taken over providing the wireless service.
Figure 5:
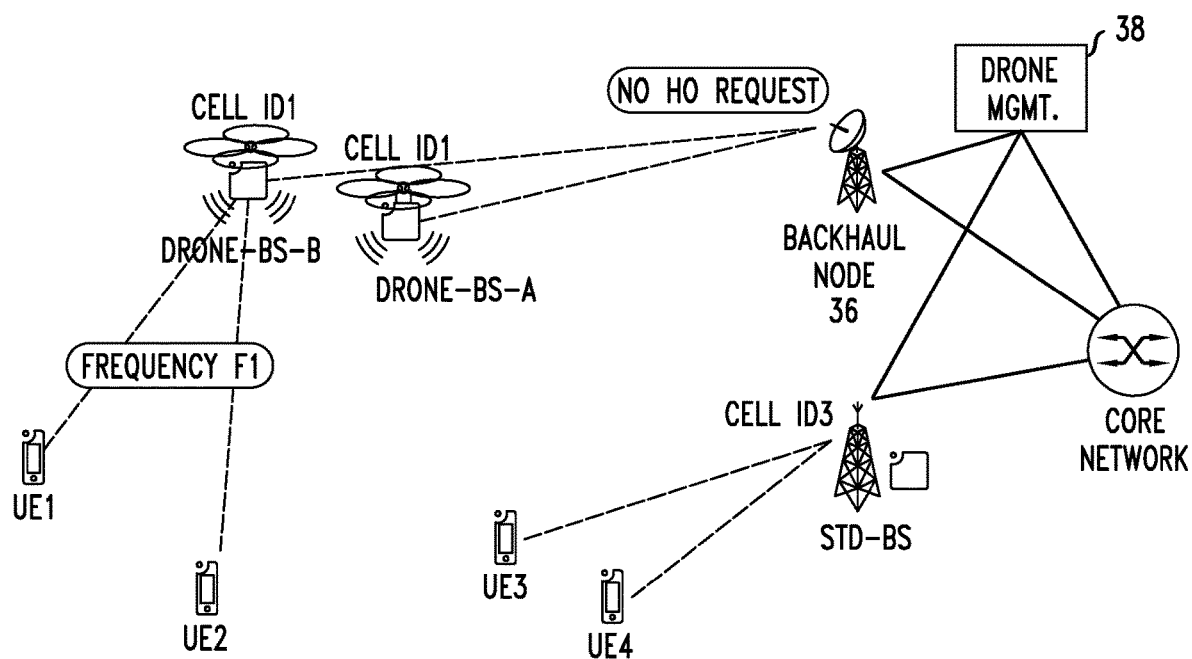

As shown in FIGS. 3 to 5, a network 32 for cellular wireless telecommunications includes a terrestrial base station 34, a backhaul node 36, drone management stage 38 and a cellular communications core network 40. The backhaul node is connected wirelessly to two drone base stations 42, denoted Drone-BS-A and Drone-BS-B.

The backhaul node 36 and terrestrial base station 34 are connected to the drone management stage 38 and the core network 40. Some user terminals are connected to the terrestrial base station 34. In the FIGS. 3 to 5, two of these user terminals are shown for simplicity, denoted UE3 and UE4.

The terrestrial base station 34 is a base station mounted at a fixed location. In this example, the terrestrial base station 34 is a macrocell base station. In another otherwise similar example (not shown) the terrestrial base station 34 is a small cell base station.

The drone base stations 42 each consists of a small cell base station mounted on a drone, where a drone is a small pilot-less radio controlled aircraft and have a radio link to the backhaul node 36. A drone base station 42 provides a small cell coverage area to provide service to user terminals. Two drone-connected user terminals denoted UE1 and UE2 are shown for simplicity in FIGS. 3 to 5.

In this example, the radio link from each drone base station 42 to the backhaul node 36 is on the same Radio Access Technology (RAT), same frequency band and same antenna type as the connections to the user terminals UE1, UE2. However in some other, otherwise similar, examples (not shown) a different RAT, frequency band and/or antenna type is/are used.

The backhaul node 6 acts to transmit data from the drone base stations 42 into the network 32. The drone management stage 38 is shown as a separate unit for ease of explanation. In practise, the drone management stage is integrated into any of the network nodes, for example the terrestrial base station, core network or backhaul node.

Before Drone Base Station Replacement

As seen in FIG. 3, in a first phase, a Drone-BS-A serves user terminals UE1, UE2.

Drone Base Station Replacement

An example mechanism for drone base station replacement will now be described with reference to FIGS. 3 to 6. The numbering of the steps as used here are those of the steps as numbered in FIG. 6. Of course, other mechanisms are possible.

Figure 6:
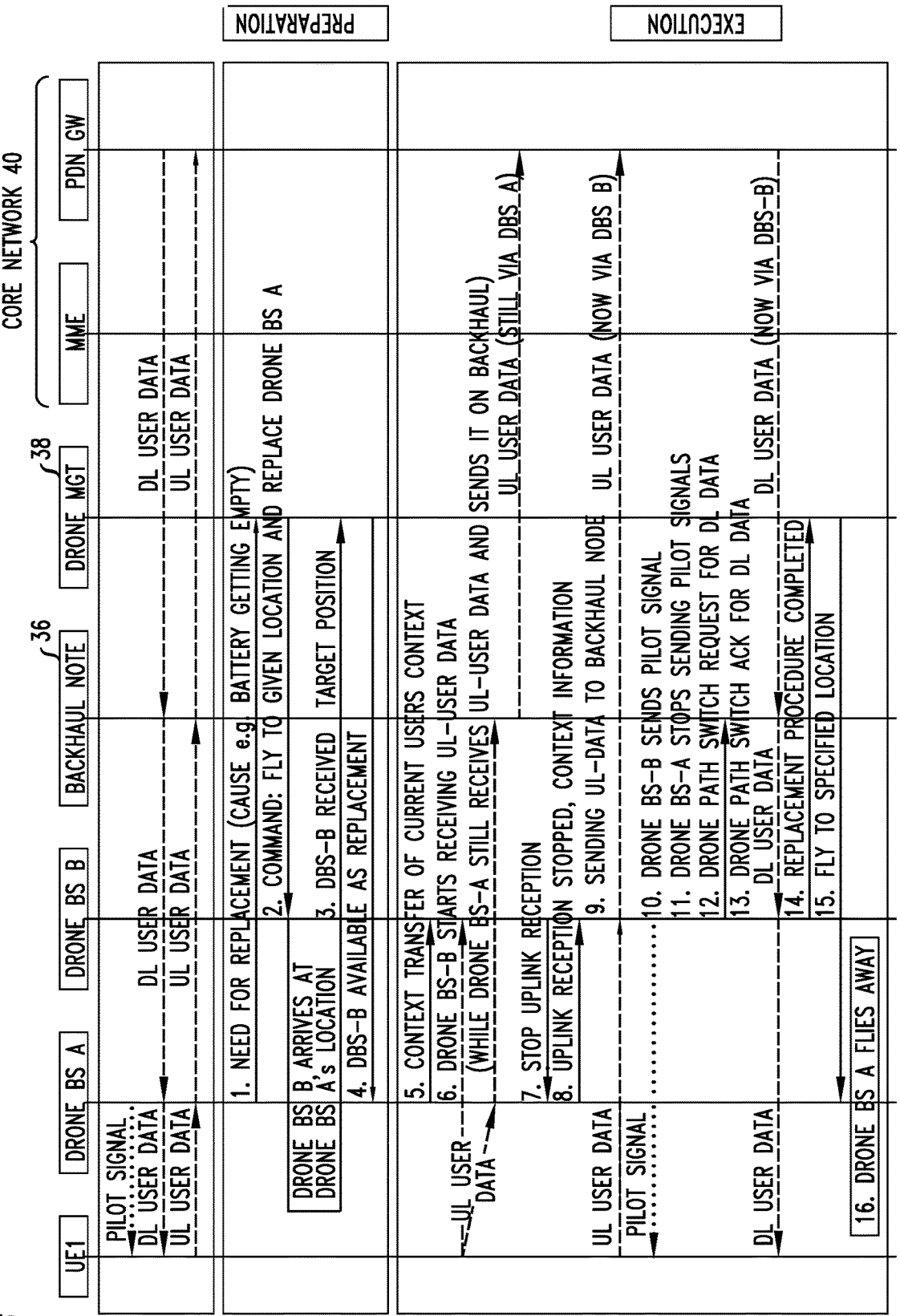
FIG. 6 is a message sequence diagram illustrating the drone handover procedure in the network shown in FIGS. 3 to 5.

In FIG. 6, a mobile management entity (MME) and Packet Data Network Gateway (PDN GW) are shown. These are parts for the core network 40.

Detecting the Need for Replacement:

Step 1: Drone-BS-A detects the need to be replaced, in this example because its battery is getting empty. Drone-BS-A informs the network 32 by sending a message via the backhaul node 36 to the Drone Management stage 38. The message contains information as to: Cause for replacement, Measurement reports of base stations measured by Drone-BS-A, and Measurement reports of Drone base stations as well as of terrestrial bases stations, if available, as measured by user terminals and sent to the Drone-BS-A.

Sending Replacement Drone-BS to the Location:

Step 2: The Drone Management stage 38 decides that another drone should replace Drone-BS-A. It selects Drone-BS-B for this and commands Drone-BS-B to fly to the location of Drone-BS-A (see FIG. 4). Please note that for safety reasons, Drone-BS-B is always kept at least a minimum distance from Drone-BS-A.

Drone-BS-B Arrives in the Vicinity of Drone-BS-A:

Step 3: Once Drone-BS-B has reached the given geographical position, Drone-BS-B informs the Drone-Management stage 38 that it has reached that target position.

Step 4: The Drone-Management stage 38 informs Drone-BS-A that the replacement drone, namely Drone-BS-B, is now available. (In an otherwise similar alternative embodiment (not shown), Drone-BS-B send this information of availability directly to the Drone-BS-A).

Take-Over of the Wireless Service by Drone-BS-B (see FIG. 5):

Step 5: Drone-BS-B is then configured to take over the wireless service. This includes the transfer to Drone BS-B of configuration data in respect of Drone-DB-A and the transfer of the current users' contexts.

Step 6: Drone-BS-B starts receiving uplink user data (while Drone-BS-A still does too). At this time, only Drone-BS-A forwards the uplink user data to the backhaul node 36.

Step 7: When Drone-BS-B identifies that itself (Drone-BS-B) is properly receiving the uplink data and forwarding that data to the backhaul node 36, Drone-BS-B instructs Drone-BS-A to stop uplink reception.

Step 8: Drone-BS-A acknowledges stopping uplink reception and reports to Drone-BS-B the context information for the uplink user data that Drone BS-A has already forwarded via backhaul node 36.

Step 9: Drone-BS-B starts sending uplink data via the backhaul node 36 (making use of the context information for data already sent via Drone-BS-A and the backhaul node 36).

Step 10: Drone-BS-B starts sending Pilot Signals (using the same cell-id, namely Cell ID1, and same radio frequency band f1, as used by Drone-BS-A).

Step 11: Drone-BS-A stops sending Pilot Signals.

In this example Steps 10 and 11 are synchronized by Drone-BS-A detecting (not shown) a pilot signal from Drone-BS-B. Other options are possible. For example in some other embodiments (not shown) a message is sent from Drone-BS-B to Drone BS-A to indicate that Drone-BS-B has started sending pilot signals and Drone-BS-A should stop pilot signals).

Figure 7:
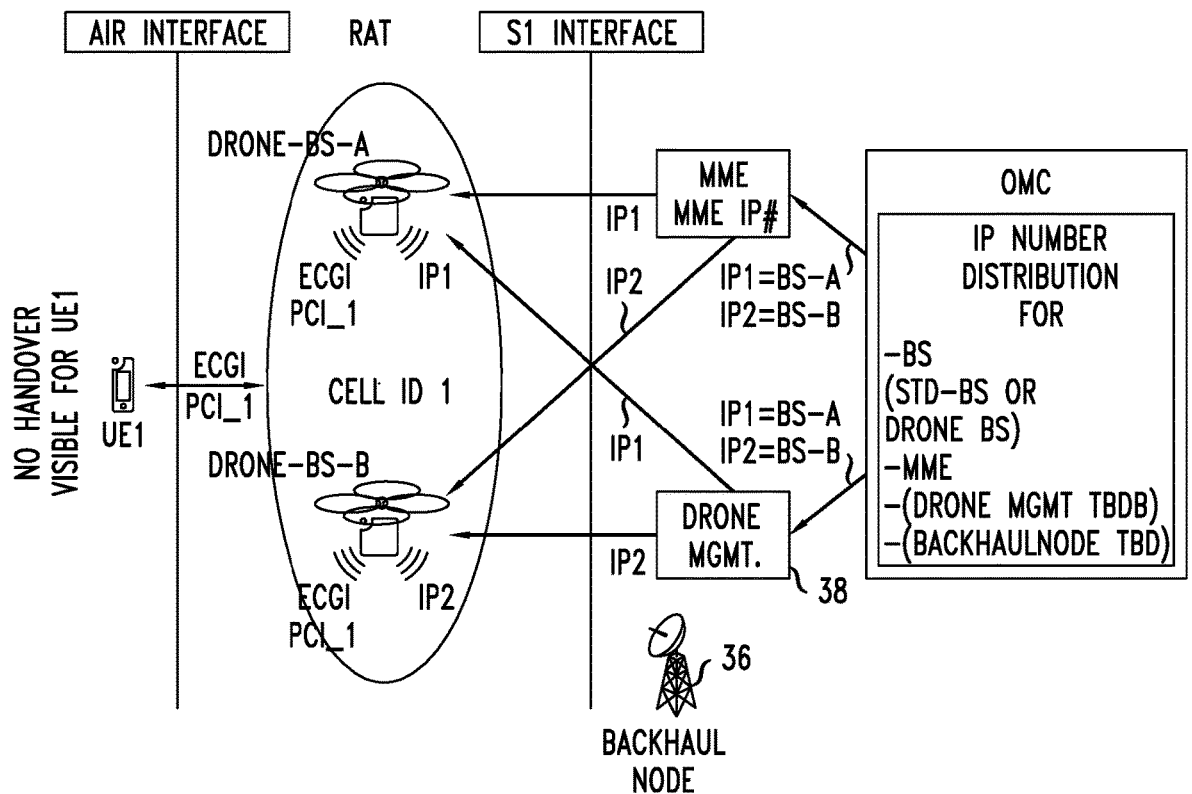
FIG. 7 is a diagram illustration how the two drone base stations are differentiated by the backhaul node for downlink user data transmissions using Internet Protocol identifying numbers.

Step 12: Drone-BS-B informs the backhaul node 36 directly to switch the path for the downlink user data so that the downlink user data is no longer sent to Drone-BS-A but to Drone-BS-B. In an alternative embodiment (not shown), Drone-BS-A informs the backhaul node. In another alternative embodiment (not shown), the backhaul node 36 is informed via the drone management stage rather than directly via the backhaul node. As shown in FIG. 7, the backhaul node 36 and Drone management stage 38 differentiate between the two drone base stations for this purpose using their unique Internet Protocol identifiers. In this example, these identifiers are IP1 for Drone-BS-A and IP2 for Drone-BS-B. The identities IP1 and IP2 are provided by an Operations and Management Centre OMC which is part of the core network. The drone base stations also have an ECGI (Enhanced Cell Global Identifier which is the same for both drone base stations in this example. The drone base stations also share a further identifier PC1_1.

Step 13: Drone-BS-B starts transmitting downlink user data.

Step 14: Drone-BS-A stops transmitting downlink user data; and Drone-BS-B informs the drone management stage 38 that the procedure is completed (Drone BS-B has now taken over all wireless service).

Step 15: The drone management stage 38 instructs Drone BS-A to fly to a different location.

Drone-BS-A Flies Away:

Step 16: Drone-BS-A flies away, e.g., to its base or to another location where, for example, the battery can be charged or replaced.

Some Further Details

It should be noted that this drone replacement procedure is transparent to the user terminals that were connected to Drone-BS-A before the drone replacement. Their user data transmissions continue as the connections to the user terminals are seamlessly handed over to the replacement Drone-BS-B.

In these seamless handovers, the cell identity (CellID1 in this example) is unchanged. From the perspective of a user terminal no handover is seen. Also the C-RNTI (Control plane—Radio Network Temporary Identifier) is retained unchanged by the drone handover.

Also the mobile management entity sees an unchanged cell identifier CellID1, so a S1AP Path switch is not required to attach Drone-BS-B to the MME. S1 denotes an interface between a small cell base station and a gateway (not shown in FIGS. 3 to 6). AP denotes Access Point. Also no new S1 interface is required.

As regards the drone management stage 38, this sees the both drones, in other words two small cells, both having the same cell identifier, CellID1. The drone management stage coordinates the handover via appropriate control signalling to the drones.

X2 Routing

As part of the drone replacement procedure, both the cell context and user terminal context (denoted UE context) are transferred from Drone-BS-A to Drone-BS-B using an X2 interface. The X2 interface is a logical direct link between the two drones.

Figure 8:
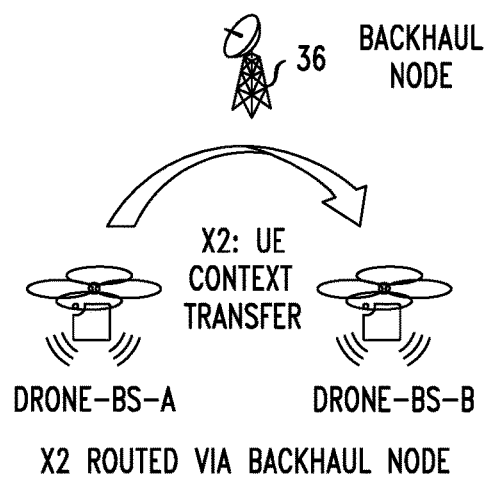
FIG. 8 is a diagram illustrating the X2 interface routing in the network shown in FIGS. 3 to 5.

As shown in FIG. 8, in this example (which described above with reference to FIGS. 3 to 6), physically speaking, the X2 interface passes via the backhaul node 36. In consequence, the UE context is routed via the backhaul node 36. This approach has an advantage in providing and guaranteeing a layer of interoperability if Drone-BS-A and Drone-BS-B are from different equipment manufacturers.

Referring back to FIG. 7, the drone base stations exchange information over the X2 interface using, as addresses in the information messages, their IP identifiers, IP1 and IP2.

Figure 9:
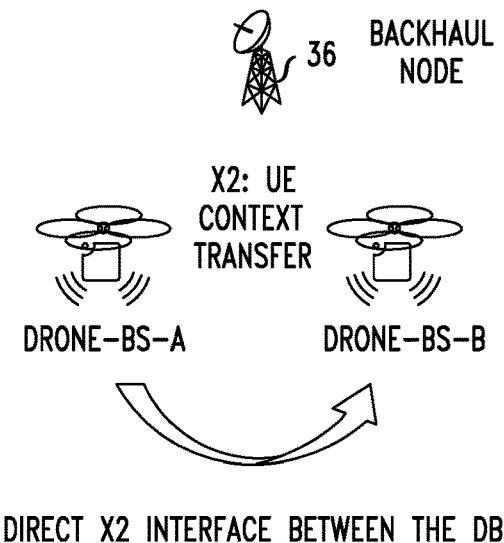
FIG. 9 is a diagram illustrating alternative X2 interface routing in an alternative network (not shown)

As shown in FIG. 9, alternatively, in otherwise similar example networks (not shown), the X2 interface passes physically directly from drone to drone. X2 messages pass directly over a wireless interface between the drones, where the wireless interface uses any appropriate radio access technology (RAT), for example Long Term Evolution Device-to-Device ((LTE-D2D) technology, Wireless Local Area Network (WLAN), or microwave. The UE context is transmitted directly between the drones. This has the advantage that UE context transfer is faster as no intermediate node, such as the backhaul node, is involved. In some alternative examples, the direct physical interface uses a different radio access technology and radio frequency band to that used between the drone base station and its connected user terminals. Other advantages are that there is no load on the backhaul node due to UE context transfer and there is less radio interference to terrestrial base stations, for example to macrocell base stations in an underlying macrocellular network. Of course in the case that the drones are from different manufacturers, the protocols of the physical interface may need to be standardised.

It will be noted that that in the examples shown in FIGS. 8 and 9, even though the interface between drones differs physically, the relevant control signalling procedures are the same as they are defined logically by the X2 interface between the drones.

Frequency Band Usage

Figure 10:
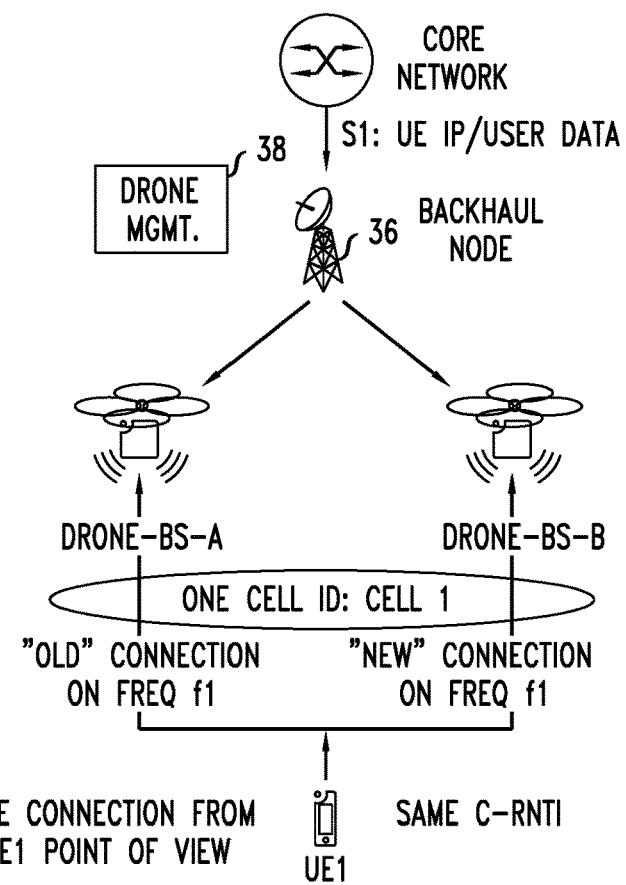
FIG. 10 is a diagram illustrating use of a single RF frequency band in the network shown in FIGS. 3 to 5.

As shown in FIG. 10, in the example described by reference to FIGS. 3 to 8, both Drone-BS-A and Drone-BS-B use the same frequency band. Drone-BS-A and Drone-BS-B are synchronised so that when Drone-BS-B starts sending pilot signals, Drone-BS- stops sending pilot signals. Similarly, when Drone-BS-A stops transmitting user data downlink (to a user terminal), Drone-BS-B takes over the transmission of user data downlink.

Alternatively, in an otherwise similar example (not shown), the frequency band is split into two-sub-bands and each of the two drone base stations uses a different sub-band. This reduces the requirement of synchronisation. Also there is less risk of significant interference between the two drone base stations. Taking this approach, during UE context transfer, the Drone-BS-A occupies the first sub-band serving some user terminals in the cell. Meanwhile, Drone-BS-B uses the other sub-band to make connections with both other user terminals in the cell and user terminals connected to Drone-BS-A for which Drone-BS-B has received the UE context.

Base Transceiver Unit

Figure 11:
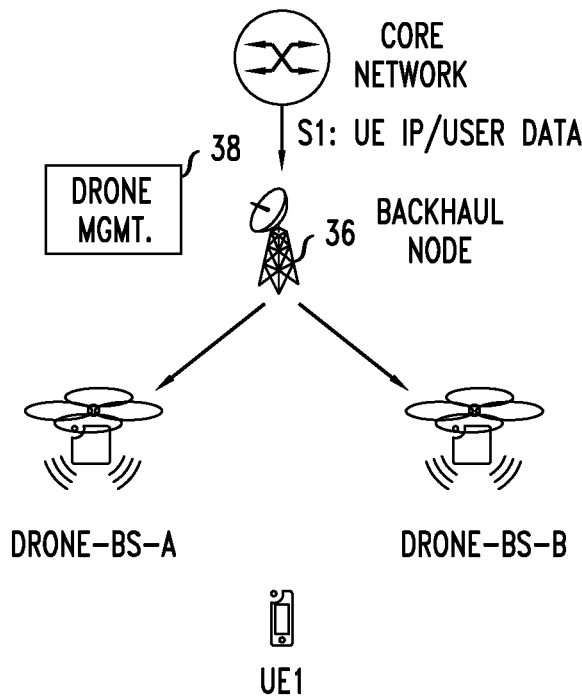
FIG. 11 is a diagram illustrating the drone base stations in the network shown in FIGS. 3 to 5.
Figure 12:
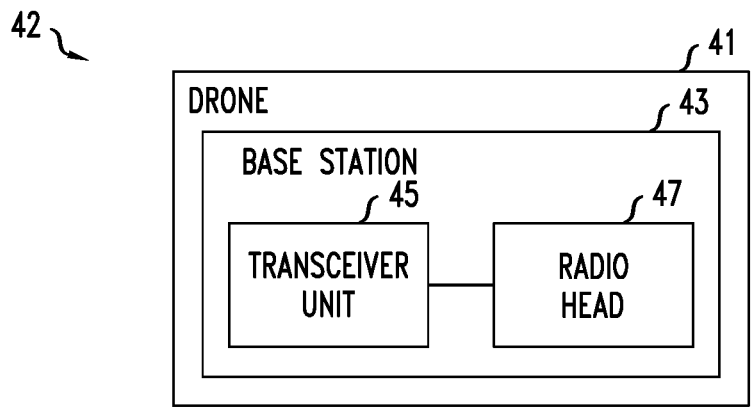
FIG. 12 is a diagram illustrating alternative drone base stations in an alternative network (not shown)

As shown in FIGS. 11 and 12, considering a base station 43 as including a base transceiver unit 45 and a radio head 47, in the example described above with reference to FIGS. 3 to 7 and 9 the base stations 43 are mounted on the drones 41, to form the drone base stations 42.

Figure 13:
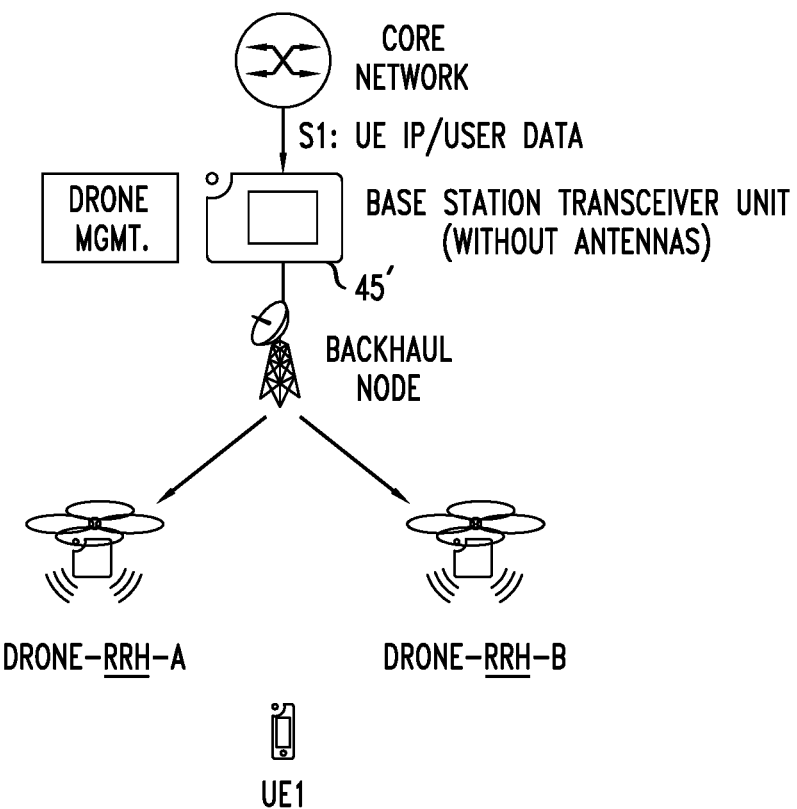
FIG. 13 is a diagram illustrating alternative drone base stations with remote radio heads, and FIG. 14 s a diagram illustrating alternative drone base stations in an alternative network (not shown).
Figure 14:
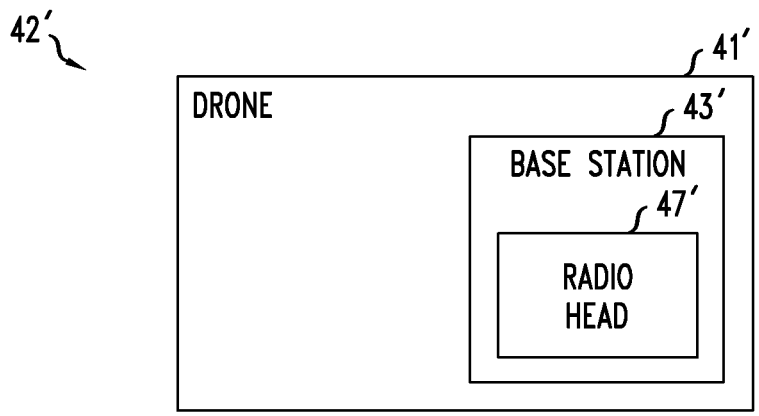

Alternatively, as shown in FIGS. 13 and 14, a radio head 47' is mounted on a drone 41' whilst the base transceiver unit 45' is located elsewhere in the network for example on the ground attached to the backhaul node. The radio head 47' is then often referred to as a remote radio head (RRH). Using this approach, it can be considered that the drone-mounted base station 43' is pared down. Less processing is undertaken on the drone 41', for example UE context transfer. Also synchronisation requirements are less stringent as both Drone-BS-A and Drone-BS-B are served by the same base transceiver unit. However, more control data is sent via the backhaul link with the backhaul node than compared to if the base transceiver unit were drone-mounted.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

A person skilled in the art would readily recognize that steps of various above-described methods can be performed by programmed computers. Some embodiments relate to program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. Some embodiments involve computers programmed to perform said steps of the above-described methods.

The invention claimed is:

1. A method of replacing a first drone base station with a second drone base station, the method comprising:
   sending by the first drone base station first pilot signals indicating a cell identifier; receiving by the first drone base station information that the second drone base station is in the vicinity of the first drone base station;
   sending by the second drone base station second pilot signals which indicate the same cell identifier as the first drone base station;
   receiving by the first drone base station from the second drone base station an indication to cease to send first pilot signals; and
   dependent upon receiving by the first drone base station from the second drone base station the indication to cease to send first pilot signals, ceasing by the first drone base station the sending of first pilot signals,
   the method further comprising:
   upon said receiving by the first drone base station information that the second drone base station is in the vicinity, transferring user context information of connections of the first drone base station with user terminals from the first drone base station to the second drone base station;
   switching uplink user data connections with the plurality of user terminals from the first drone base station to both the first drone base station and the second drone base station, and then switching the uplink user data connections with the plurality of user terminals to the second drone base station but not the first drone base station,
   in which the switching the uplink user data connections with the plurality of user terminals to the second drone base station but not the first drone base station comprises the second drone base station sending an instruction to the first drone base station to stop uplink reception and the first drone base station sending an acknowledgement.

2. The method according to claim 1, in which the acknowledgement is sent together with user context data of uplink user data that has been received and forwarded by the first drone base station towards a backhaul node.

3. The method according to claim 1, further comprising switching the path for downlink user data from via the first drone base station to via the second drone base station by making use of IP addresses to differentiate between the first and second drone base stations.

4. The method according to claim 3, in which said switching the path for downlink user data is triggered by the second drone base station sending a request for switching the path for downlink user data.

5. The method according to claim 1, in which the second drone base station uses the same radio frequency band as the first base station.

6. A first drone base station comprising:
   at least one processor; and
   at least one memory including computer program code;
   the at least one memory and the computer program code configured to, with the at least one processor, cause the first drone base station at least to perform:
   sending first pilot signals indicating a cell identifier;
   receiving information that the second drone base station is in the vicinity of the first drone base station and second pilot signals which indicate the same cell identifier as the first drone base station;
   receiving from the second drone base station an indication to cease to send first pilot signals; and
   ceasing the sending of first pilot signals dependent upon receiving from the second drone base station the indication to cease to send first pilot signals,
   wherein the at least one memory and the computer program code are further configured to, with the at least one processor, cause the first drone base station at least to perform;
   upon being informed that the second drone base station is in the vicinity, sending user context information of connections with user terminals towards the second drone base station;
   receiving an instruction to stop uplink reception; and
   in response, stopping uplink user data connections with the plurality of user terminals to the first drone base station, and
   sending an acknowledgment of the instruction towards the second base station.

7. The first drone base station according to claim 6, the at least one memory and the computer program code configured to, with the at least one processor, causing the first drone base station at least to perform sending, together with the acknowledgement, user context data of uplink user data that has been received and forwarded by the first drone base station to a backhaul node.

8. A second drone base station comprising:
   at least one processor; and
   at least one memory including computer program code;
   the at least one memory and the computer program code configured to, with the at least one processor, cause the second drone base station at least to perform:
   receiving a command to fly to a given location in the vicinity of the first drone base station,
   transmitting a signal indicating that the location has been flown to,
   sending second pilot signals which indicate the same cell identifier as the first drone base station;
   sending towards the first drone base station an indication to cease to send first pilot signals, wherein the at least one memory and the computer program code is further configured to, with the at least one processor, cause the second drone base station at least to perform:
receiving user context information from the first drone base station of the connections with the plurality of user terminals,
undertaking uplink reception,
sending towards the first drone base station an instruction to stop uplink reception so as to have the uplink user data connections with the plurality of user terminals with the second drone base station but not with the first drone base station,
receiving from the first base station an acknowledgement of the instruction.

9. The second drone base station according to claim 8, the at least one memory and the computer program code configured to, with the at least one processor, causing the second drone base station at least to perform:
sending an instruction towards a backhaul node to switch the path for downlink user data from via the first drone base station to via the second drone base station by making use of IP addresses to differentiate between the first and second base stations.

* * * * *